Feb. 9, 1932.  B. RABINOWITZ  1,844,597
AUTOMATICALLY LOCKED AND SECURED RECEPTACLE
FOR MILK BOTTLES AND CONTAINERS
Filed April 9, 1929  2 Sheets-Sheet 1

Inventor:
Bertha Rabinowitz,
By her Attorney
Israel Benjamins.

Feb. 9, 1932.  B. RABINOWITZ  1,844,597
AUTOMATICALLY LOCKED AND SECURED RECEPTACLE
FOR MILK BOTTLES AND CONTAINERS
Filed April 9, 1929   2 Sheets-Sheet 2

Inventor:
Bertha Rabinowitz,
By her Attorney
Israel Benjamins.

Patented Feb. 9, 1932

1,844,597

UNITED STATES PATENT OFFICE

BERTHA RABINOWITZ, OF BROOKLYN, NEW YORK

AUTOMATICALLY LOCKED AND SECURED RECEPTACLE FOR MILK BOTTLES AND CONTAINERS

Application filed April 9, 1929. Serial No. 353,763.

My invention relates to improvements in receptacles for bottles and containers of milk, and it consists in the novel features, which are hereinafter described.

One of the objects of my improvement is to provide a receptacle for bottles and containers of milk, which may be automatically locked after a bottle or container of milk is placed therein, thereby preventing possible theft of said bottles or containers or the contamination of the contents thereof by animals, such as cats.

Another object of my improvement is to have said receptacle automatically secured at the door of a dwelling by the closing of said door and to have the same released by the opening of said door.

A further object of my improvement is to provide a ready means for opening said receptacle after it is released, as herein before stated.

Another object of my invention is to have said receptacle simple, durable and inexpensive.

Other objects and advantages will hereinafter appear.

I attain these objects by the device illustrated in the accompanying drawings or by any mechanical equivalent or obvious modification of the same.

In the drawings Fig. 1 is a vertical section on the line 1—1 of Fig. 2, showing sundry parts in elevation.

Similar numerals refer to similar parts throughout the several views.

11 designates the main body of my automatically locked and secured receptacle for bottles and containers of milk and 12 the cover thereof, which is shown as pivotally connected to said body 11 by means of hinges 13 at the upper rear edge of the latter.

Figure 2:
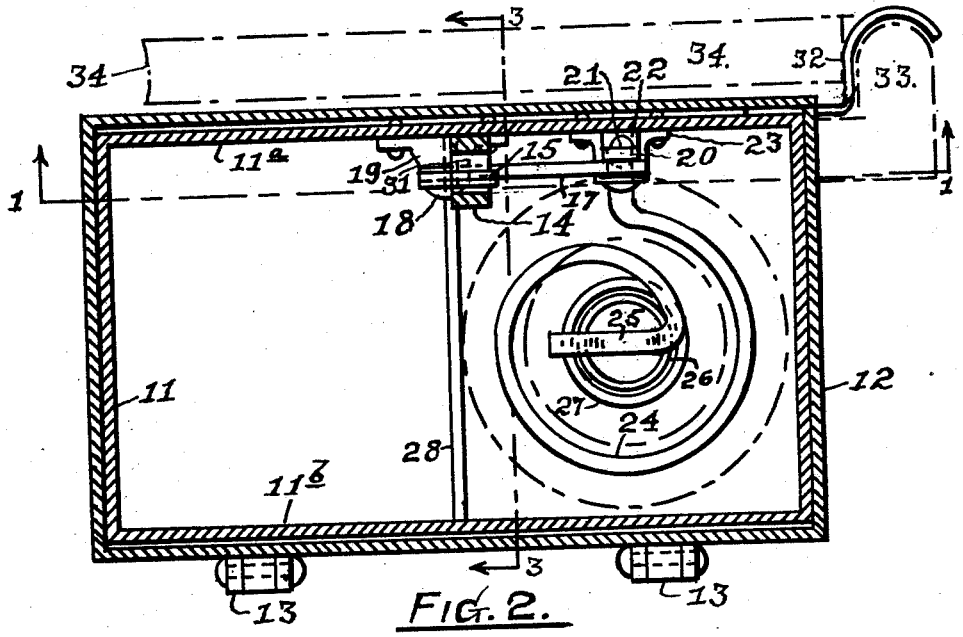
Fig. 2 is a horizontal section on the lines 2—2 of Figs. 1 and 3.
Figure 3:
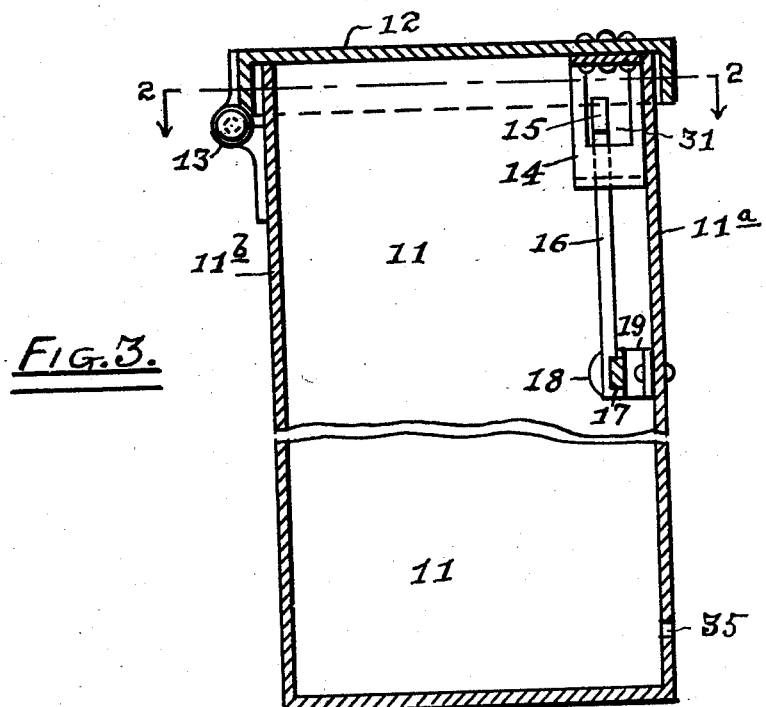
Fig. 3 is a fragmentary section on the lines 3—3 of Figs. 1 and 2, omitting the middle part of the receptacle and parts connected thereto.

A substantially rectangular frame or catch 14 is shown as secured to the cover 12 inside of the latter near the front edge thereof, to extend into the upper part of said body 11 in a plane perpendicular to said hinges 13 and to receive therein a latch 15, which is shown as formed in one with the upper or nearly but not quite vertical arm 16 of a bell crank lever 16—17, which has thereon also a substantially horizontal arm 17 and is pivotally connected by means of a pin 18 to a block 19, which is shown in Fig. 2 as secured to the front 11a of said body 11.

Figure 1:
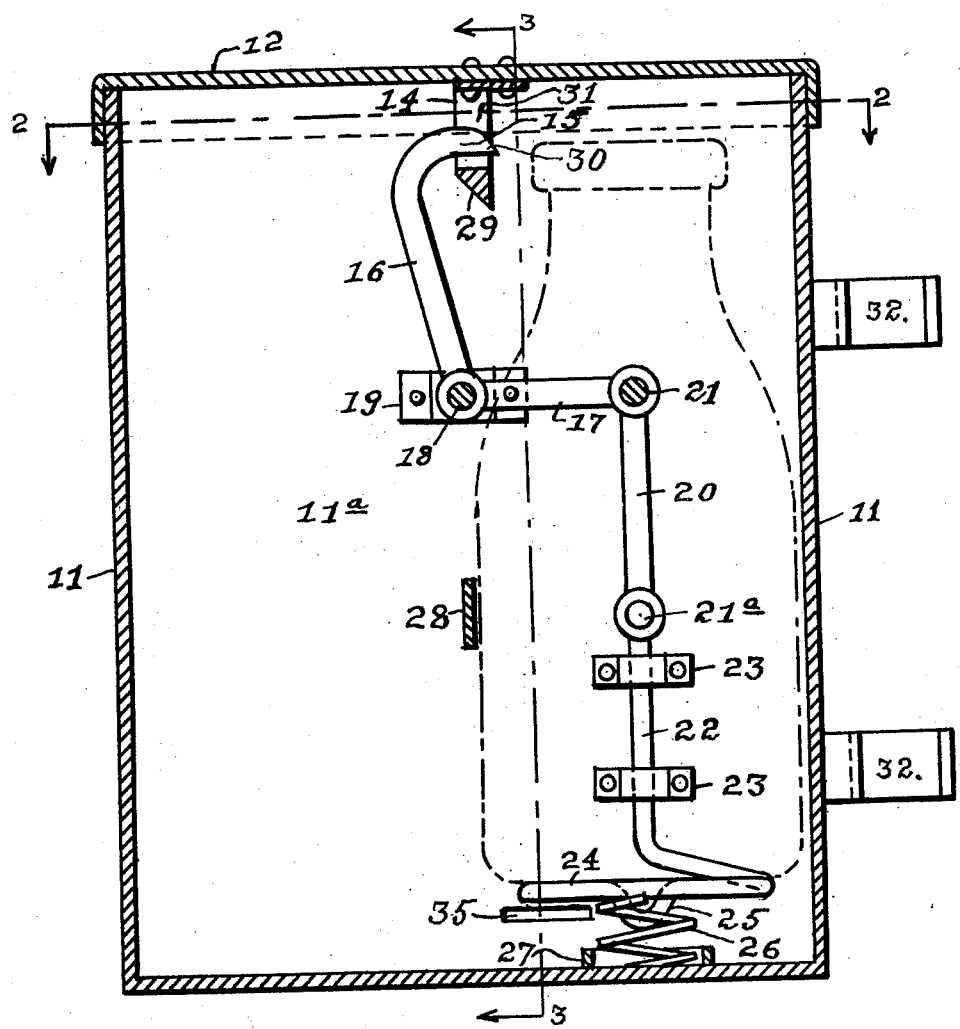

A substantially vertically disposed connecting rod 20 is shown in Fig. 1 as pivotally connected by means of a pin 21 to said arm 17 and by means of a pin 21a to the upper end of a sliding bar 22, which is preferably rectangular or prismatic in cross section as shown in Fig. 2, to prevent a tendency to rotation of the same in the guides 23, which are enclosing said bar 22 and are shown as secured to the front 11a of said body 11.

Said bar 22 is shown in Fig. 1 as terminating at the lower end thereof in a substantially spiral grating 24, which is preferably integral with said bar 22, and has therein a depression or stirrup 25, which extends downwardly into the upper end of a helical spring 26, on which said grating rests; the lower end of said spring rests on the bottom of said body 11 and is encompassed by a ring 27, which may be secured to said bottom in any suitable manner, such as by soldering; said ring 27 serves to keep the lower end of said spring 26 in place on said bottom.

A partition bar 28 extends from the front wall 11a to the rear wall 11b of said body 11, dividing the space enclosed by the latter into two substantially equal parts, into each of which a bottle or container of milk may be placed.

Larger receptacles may be made for three or more bottles or containers, and smaller receptacles for only one bottle or container may be made, if desired.

One bottle of milk is diagrammatically shown in Fig. 1 as placed on said grating 24, thereby depressing said spring 26 and drawing said bar 22 and rod 20 downwardly, whereby said lever 16—17 is turned clockwise in Fig. 1.

The placing of said bottle on said grating 24 occurs when the cover 12 of the receptacle 11—12 is open and said frame or catch 14 thereon is raised above said latch 15, which is moved from left to right in Fig. 1 by the above described turning of said lever 16—17.

Said frame or catch 14 terminates at the lower end thereof in an inverted inclined plane 29, to act upon the cam-shaped end 30 of said latch 15 when said frame 14 is moved downwardly by the closing of said cover 12, thereby moving said latch 15 towards the left in Fig. 1 and turning said lever 16—17 counterclockwise until the lower end of said frame 14 is allowed to pass said latch 15, whereupon said latch 15 is compelled by the weight of said bottle and the parts actuated thereby to move towards the right again in Fig. 1 and enter the opening 31 in said frame 14, thereby engaging the same and locking said cover 12 to said body 11.

To secure my receptacle for bottles and containers of milk at the door of a dwelling on the outer side thereof I provide one edge of the front wall 11a of said body 11 with strips 32, which are preferably of resilient material and have a shape as shown in Fig. 2, to fit a moulding 33, of a doorjamb interiorly of the dwelling.

Said moulding 33 is diagrammatically shown in Fig. 2, as well as a fragment of a door 34 in an incompletely closed position.

Said strips 32 may be placed in the position shown in Fig. 2 and when the door 34 is closed against said jamb and molding 33 said strips 32 are held securely in place, thereby securing also said body 11 in position, until said door is opened again.

Said strips 32 may be either right handed, as shown, or left handed, if desired, to fit different doors.

To open my said receptacle, I provide a slot 35 in the front wall 11a of said body 11, through which slot the end of a knife may be inserted under said grating 24 and the latter raised, whereby said bar 22 and rod 20 will turn said lever 16—17 counter clockwise and disengage said latch 15 from the opening 31 of said frame 14, thereby releasing said cover 12, which may then be turned on its hinges and opened.

When the door 34 is closed said slot 35 is inaccessible.

A plate may be placed over said grating 24 and under the bottle or container of milk, if desired; said grating 24 may also be omitted and replaced by any other suitable support for a bottle or container, if desired.

Many other changes may be made in the details of my automatically locked and secured receptacle for bottles and containers of milk without departing from the main scope of my invention, and parts of my invention may be used without other parts.

I do not, therefore restrict myself to the details as shown, in the drawings; but I intend to include also all mechanical equivalents and obvious modifications of the same within the scope of my invention.

I claim as my invention and desire to secure by Letters Patent:

1. In a receptacle for one or more bottles or containers of milk a main body enclosed on all vertical sides thereof, to be placed at the outer side of the door of a dwelling, an openable top cover on said body, a resilient support for a bottle or container at the lower end of said body, a means on said body extending to the interior of said dwelling, for engaging a part on said dwelling adjacent said door, a means for locking said cover to said body by the weight of one of said bottles or containers and the motion of said cover during the operation of closing said cover and a restricted opening in the side of said body adjacent said door, for introducing therethrough a means for raising said bottle or container when said cover is locked, whereby said locking means may be disengaged from said cover by the resilience of said support.

2. In a receptacle for one or more bottles or containers of milk a main body, an openable cover thereon, a resilient support for a bottle or container at the lower end of said receptacle, one of a pair of interengaging members on said cover, a pivotally mounted lever on said body and a means for operatively connecting said support to said lever, said lever terminating in the other of said pair of members, to be engaged by said first mentioned member by the relative motion therebetween against the resistance of said support.

3. The elements of claim 2, said connecting means including a sliding bar, guide means for directing the motion of said bar and means for joining said bar to said lever for transforming the rectilinear motion of the former into the angular motion of the latter.

4. The elements of claim 2, said connecting means including a sliding bar, guide means for directing the motion of said bar and means for joining said bar to said lever, for transforming the rectilinear motion of the former into the angular motion of the latter, and said lever having thereon a substantially vertical arm, terminating in said other member, and a substantially horizontal arm connected to said bar.

Executed this 8th day of April, 1929.

BERTHA RABINOWITZ.